United States Patent [19]

Singh et al.

[11] Patent Number: 5,043,303

[45] Date of Patent: Aug. 27, 1991

[54] FILAMENT-CONTAINING COMPOSITE

[75] Inventors: Raj N. Singh, Schenectady; William A. Morrison, Albany, both of N.Y.

[73] Assignee: General Electric Company, Schenectady, N.Y.

[21] Appl. No.: 216,471

[22] Filed: Jul. 8, 1988

Related U.S. Application Data

[63] Continuation-in-part of Ser. No. 102,054, Sep. 28, 1987, abandoned.

[51] Int. Cl.$^5$ .............................................. C04G 35/52
[52] U.S. Cl. ....................................... 501/90; 501/92; 501/96; 501/99; 501/154; 264/60; 428/361; 428/366; 428/374; 428/446; 428/698; 428/704
[58] Field of Search .................... 501/92, 96, 99, 154, 501/90; 264/60; 428/361, 366, 374, 446, 498, 704

[56] References Cited

U.S. PATENT DOCUMENTS

| | | | |
|---|---|---|---|
| 4,120,731 | 10/1978 | Hillig et al. | 428/698 |
| 4,148,894 | 4/1979 | Hillig et al. | 428/698 |
| 4,238,433 | 12/1980 | Hillig et al. | 264/60 |
| 4,410,635 | 10/1983 | Brennan et al. | 501/88 |
| 4,636,480 | 1/1987 | Hillig | 501/96 |
| 4,657,876 | 4/1987 | Hillig | 501/96 |

*Primary Examiner*—Stephen J. Lechert, Jr.
*Attorney, Agent, or Firm*—James Magee, Jr.; James C. Davis, Jr.

[57] ABSTRACT

Boron nitride is coated on filaments of elemental carbon and/or silicon carbide, the coated filaments are contacted with an infiltration-promoting material containing elemental carbon to produce a preform wherein the filaments are substantially parallel and each filament is enveloped with infiltration-promoting material, and the preform is infiltrated with a molten solution of boron and silicon producing a composite containing boron nitride coated filaments.

44 Claims, No Drawings ns of 5,043,303

FILAMENT-CONTAINING COMPOSITE

This is a continuation-in-part of copending application Ser. No. 102,054 filed on Sept. 28, 1987, abandoned.

The following applications and patents are assigned to the assignee hereof and are incorporated herein by reference:

U.S. Application Ser. No. 100,806 filed on Sept. 24, 1987 for Filament-Containing Composite, Singh et al., discloses a process where boron nitride is coated on filaments of elemental carbon and/or silicon carbide, the coated filaments are contacted with an infiltration-promoting material containing elemental carbon to produce a preform wherein the filaments are substantially parallel and each filament is enveloped with infiltration-promoting material, and the preform is infiltrated with molten silicon to produce a composite containing boron nitride coated filaments.

U.S. Application Ser. No. 056,516 filed on June 1, 1987 U.S. Pat. No. 5,015540 for Fiber-Containing Composite, Borom et al., discloses a process where fibrous material is coated with boron nitride and a silicon-wettable material, the coated fibrous material is admixed with an infiltration-promoting material which is at least partly elemental carbon and the mixture is formed into a preform which is infiltrated with molten silicon producing a composite containing boron nitride coated fibrous material.

U.S. Application Ser. No. 066,271 filed on June 25, 1987, now abandoned in favor of contintuion-in-part application Ser. No. 216,488, filed July 8, 1988 for Fiber-Containing Composite, Singh et al., discloses a process where fibrous material is coated with boron nitride and a silicon-wettable material, the coated fibrous material is admixed with an infiltration-promoting material which is at least partly elemental carbon and the mixture is formed into a preform which is infiltrated with a molten solution of boron and silicon producing a composite containing boron nitride coated fibrous material.

U.S. Pat. Nos. 4,120,731; 4,141,948; 4,148,894; 4,220,455; 4,238,433; 4,240,835; 4,242,106; 4,247,304; 4,353,953 and 4,626,516 disclose silicon infiltration of materials which include carbon, molybdenum, carbon-coated diamond and/or cubic boron nitride, and blends of carbon with silicon carbide, boron nitride, silicon nitride, aluminum oxide, magnesium oxide and zirconium oxide.

This invention relates to the production of a composite containing aligned boron nitride-coated filaments in a matrix containing silicon carbide and/or boron-containing silicon carbide phase and a phase of a solution of boron and elemental silicon.

Many efforts have been extended to produce fiber reinforced, high temperature materials. Structures of carbon fiber reinforced carbon matrices (carbon-carbon or C/C composites) have been used in aircraft construction but they have the disadvantage of poor to no oxidation resistance (i.e. they burn). High strength carbon fibers were infiltrated with molten silicon with the hope that the silicon matrix would protect the carbon filaments. However, the carbon filaments converted instead into relatively weak, irregular columns of SiC crystals resulting in composites with low toughness and relatively modest strength.

As an alternative approach, attempts have been made to incorporate SiC type fibrous material in a silicon matrix by the process of silicon infiltration. There are a number of problems when silicon carbide fibrous material is infiltrated with silicon. Even though SiC has limited solubility in molten silicon, this solubility leads to transport and recrystallization of SiC thereby causing the SiC fibers to lose substantial strength. Also, silicon carbide forms a strong bond with silicon which results in brittle fracture of the composite.

The present process utilizes a molten solution of boron and silicon to infiltrate a preform containing carbon-containing filaments such as, for example, carbon or silicon carbide filaments, to produce a composite in which the filaments have not been affected, or have not been significantly deleteriously affected, by processing conditions. In the present process, boron nitride, which is coated on the filaments, bars any significant contact of the filaments with the infiltrant. Since boron nitride is not wettable by silicon, the aforementioned pending applications Ser. Nos. 056,516 and 066,271 disclose depositing a coating of a silicon-wettable material on the boron nitride coating. The present invention overcomes the problem of non-wettability of the boron nitride coating by using filaments of sufficiently large diameter and which are spaced sufficiently from each other to produce the present preform. The boron nitride-coated filaments are contacted with infiltration-promoting material to produce a preform wherein each coated filament is enveloped by infiltration-promoting material to enable capillary infiltration of the preform by molten infiltrant to produce the present composite.

Those skilled in the art will gain a further and better understanding of the present invention from the detailed description set forth below considered in conjunction with the accompanying figure which forms a part of the specification and which shows a graph (continuous line) illustrating the load-deflection behavior of the present composite, and another graph (broken line) illustrating the load-deflection behavior of a composite produced without boron nitride coating on the filaments as well as that of a product produced without filaments.

Briefly stated, the present process for producing a composite with a porosity of less than about 10% by volume comprised of boron nitride-coated filaments and a matrix phase, said filament component of said coated filaments comprising at least about 10% by volume of the composite, said matrix phase containing silicon carbide and/or boron-containing silicon carbide formed in situ in at least about 5% by volume of the composite and a solution of elemental boron and elemental silicon in at least about 1% by volume of the composite, comprises the following steps:

(a) providing a carbon-containing filament having a diameter of at least about 50 microns;

(b) depositing a coating of boron nitride on said filament leaving no significant portion thereof exposed;

(c) providing infiltration-promoting material in the form of particulates and/or fibers, said infiltration-promoting material containing elemental carbon;

(d) contacting a plurality of said boron nitride-coated filaments with said infiltration-promoting material to produce a preform wherein said infiltration-promoting material envelops each coated filament preventing contact therebetween and wherein said coated filaments are at least substantially parallel to each other, said preform having an open porosity ranging from about 25% by volume to about 85% by volume of the preform;

(e) providing an infiltrant comprised of boron and silicon containing elemental boron in solution in an amount of at least about 0.1% by weight of elemental silicon;

(f) contacting said preform with infiltrant-associated infiltrating means whereby said infiltrant is infiltrated into said preform;

(g) heating the resulting structure to a temperature at which said infiltrant is molten and infiltrating said molten infiltrant into said preform to produce an infiltrated product having the composition of said composite, said preform containing sufficient elemental carbon to react with said infiltrant to form said composite; and (h) cooling said product to produce said composite, said boron nitride-coated filaments being enveloped by said infiltration-promoting material to enable said infiltration by molten infiltrant.

As used herein "elemental carbon" or "carbon" includes all forms of elemental carbon including graphite.

Reference herein to filaments of silicon carbide, includes, among others, presently available materials wherein silicon carbide material envelops a core, and which generally are produced by chemical vapor deposition of silicon carbide on a core such as, for example, elemental carbon or tungsten.

In the present invention, the filaments to be coated with boron nitride can be amorphous, crystalline or a mixture thereof. The crystalline filaments can be single crystal and/or polycrystalline. The filament is a carbon-containing material which generally contains carbon in an amount of at least about 1% by weight, frequently at least about 5% by weight, of the filament. Generally, the filament to be coated with boron nitride is selected from the group consisting of elemental carbon, a SiC-containing material and a combination thereof. The SiC-containing material contains at least about 50% by weight of silicon and at least about 25% by weight of carbon, based on the weight of the material. Examples of SiC-containing materials are silicon carbide, Si—C—O, Si—C—O—N, Si—C—O—Metal and Si—C—O—N—Metal where the Metal component can vary but frequently is Ti or Zr. There are processes known in the art which use organic precursors to produce Si—C containing filaments which may introduce a wide variety of elements into the filaments.

The filament to be coated with boron nitride is stable at the temperature of the present process. Also, this filament preferably has at room temperature, i.e. about 22° C., in air a minimum tensile strength of about 100,000 psi and a minimum tensile modulus of about 25 million psi. Preferably, the carbon filament is a high strength, high modulus filament such as derived from the pyrolysis of rayon, polyacrylonitrile or pitch.

The present filament is a continuous filament having a diameter of at least about 50 microns. Generally, the diameter of the filament ranges from about 50 microns to about 250 microns, frequently from about 70 microns to about 200 microns, or from about 100 microns to about 150 microns. The filament can be as long as desired and has a minimum length of at least about 10 times its diameter. Generally, it is longer than about 1000 microns, or it is longer than about 2000 microns.

The minimum diameter of the present filament depends largely on the minimum spacing required between the boron nitride-coated filaments through which the infiltration-promoting material must penetrate and is determinable empirically. As the diameter of the filament decreases, the total amount of space between filaments decreases making it more difficult for the infiltration-promoting material to penetrate the space. As a result, the present invention enables the production of a composite with a high volume fraction of aligned spaced continuous filaments not attainable with filaments of smaller diameter. Also, as the diameter of the filament decreases, its surface area per unit volume increases making it more difficult for the infiltration-promoting material to envelop each filament to enable infiltration of the resulting preform by molten silicon by capillarity to produce the present composite. Specifically, the infiltration-promoting material should envelop each boron nitride-coated filament leaving no significant portion thereof exposed, i.e. uncovered or open to space, in the preform. Should a significant portion of a boron nitride-coated filament be exposed within the preform, it would not be wetted by the infiltrating silicon and would result in a significantly large closed pore which may have a significantly deleterious effect on the mechanical properties of the composite. Generally, filaments having a diameter of less than about 50 microns are not useful in the present invention because they may not be practical to use or they may be inoperable for producing composites with a desired high volume fraction of filaments.

In carrying out the present process, boron nitride is coated on the filament to produce a coating thereon which leaves at least no significant portion of the filament exposed, and preferably, the entire filament is coated with boron nitride. Preferably the entire wall of each individual filament is totally coated with boron nitride leaving none of the walls exposed. The ends of the filament may be exposed but such exposure is not considered significant. Most preferably, the entire filament is totally enveloped, i.e. encapsulated, with a coating of boron nitride. The boron nitride coating should be continuous, free of any significant porosity and preferably it is pore-free. Preferably, the boron nitride coating is uniform or at least significantly uniform.

The boron nitride coating can be deposited on the filament by a number of known techniques under conditions which have no significant deleterious effect on the filament. Generally, the boron nitride coating can be deposited by chemical vapor deposition by reactions such as:

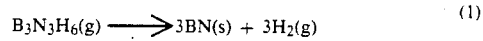

$$B_3N_3H_6(g) \longrightarrow 3BN(s) + 3H_2(g) \quad (1)$$

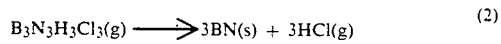

$$B_3N_3H_3Cl_3(g) \longrightarrow 3BN(s) + 3HCl(g) \quad (2)$$

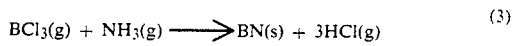

$$BCl_3(g) + NH_3(g) \longrightarrow BN(s) + 3HCl(g) \quad (3)$$

Generally, the chemical vapor deposition of boron nitride is carried out at temperatures ranging from about 900° C. to 1800° C. in a partial vacuum, with the particular processing conditions being known in the art or determinable empirically.

The boron nitride coating should be at least sufficiently thick to be continuous and free of significant porosity. Generally, its thickness ranges from about 0.3 microns to about 5 microns, and typically it is about 0.5 microns. The particular thickness of the coating is determinable empirically, i.e. it should be sufficient to prevent reaction, or prevent significant reaction, between the filament and the infiltrant, i.e. its elemental silicon component, under the particular processing conditions used. During the infiltration process, the boron nitride coating may or may not react with or dissolve in the molten infiltrant depending on the amount of elemental boron in solution in elemental silicon. When a saturated solution of boron and silicon is used as an infiltrant, the boron nitride coating will not react with or dissolve in the molten infiltrant. However, when an unsaturated solution of boron and silicon is used as infiltrant, the boron nitride coating may or may not react with or dissolve in the molten infiltrant and this is determinable empirically depending largely on time, temperature and concentration of boron in solution. For example, for a given unsaturated solution, the boron nitride coating will survive better at lower temperatures and/or shorter times. Generally, infiltration time increases with the size of the preform. Larger-sized preforms, therefore, may require thicker boron nitride coatings when the infiltrant is an unsaturated solution. However, for a given infiltration time and temperature, as the concentration of boron in solution is increased, the tendency of the boron nitride coating to react with or dissolve in the molten infiltrant usually decreases.

A number of techniques can be used to determine if the boron nitride coating survived. For example, if the composite exhibits filament pull-out on fracture, then the boron nitride coating has survived. Also, scanning electron microscopy of a cross-section of the present composite can detect a boron nitride coating on the filament.

The infiltration-promoting material is a material which is wetted by molten silicon and therefore by the present infiltrant. The infiltration-promoting material as well as any reaction product thereof produced in the present process is solid in the present process. Also, the infiltration-promoting material should have no significant deleterious effect on the present process or the resulting composite. The particular composition of the infiltration-promoting material is determinable empirically and depends largely on the particular composite desired, i.e. the particular properties desired in the composite. However, the infiltration-promoting material always contains sufficient elemental carbon to enable the production of the present composite. Specifically, the preform should contain sufficient elemental carbon to react with the infiltrant to produce the present composite containing silicon carbide and/or boron-containing silicon carbide formed in situ in an amount of at least about 5% by volume of the composite. Generally, elemental carbon ranges from about 5% by volume, or from about 10% or 20% by volume, to about 100% by volume, of the infiltration-promoting material.

The infiltration-promoting material also may include a metal, generally in an amount of at least about 1% by volume of the infiltration-promoting material, which reacts with the infiltrant in the present process to form a phase of a metal silicide and/or boron-containing metal silicide. Representative of such a metal is chromium, molybdenum, tantalum, titanium, tungsten and zirconium.

The infiltration-promoting material may also include a ceramic material, generally in an amount of at least about 1% by volume of the infiltration-promoting material, which may or may not react with the infiltrant such as a ceramic carbide, a ceramic nitride or a ceramic silicide. The ceramic carbide is selected from the group consisting of boron carbide, molybdenum carbide, niobium carbide, silicon carbide and titanium carbide. The ceramic nitride is selected from the group consisting of aluminum nitride, niobium nitride, silicon nitride, titanium nitride and zirconium nitride. The ceramic silicide is selected from the group consisting of chromium silicide, molybdenum silicide, tantalum silicide, titanium silicide, tungsten silicide and zirconium silicide.

The infiltration-promoting material can be in the form of a powder, fibers or a combination thereof. When the infiltration-promoting material is in the form of a powder, it preferably has an average particle size of less than about 40 microns, more preferably less than about 10 microns. By "fiber" it is meant herein short fiber, chopped fiber, whisker and mixture thereof, i.e. a discontinuous fiber. Generally, the fiber has an aspect ratio ranging from about 10 to less than about 200, and preferably from about 20 to less than about 100. Generally, the fiber may range in diameter from about 0.2 micron to about 10 microns, and preferably from about 0.5 micron to about 10 microns. The amount and type of infiltration-promoting material depends largely on the particular composite desired and is determinable empirically. However, the infiltration-promoting material should be in a form which allows it to be formed into a suspension and which allows it to envelop each boron nitride-coated filament to produce the present preform.

In carrying out the present process, the boron-nitride coated filaments are contacted with the infiltration-promoting material to produce a preform wherein the infiltration-promoting material envelops each boron nitride-coated filament preventing contact therebetween and leaving no significant portion thereof exposed within the preform. In the preform, the boron nitride-coated filaments are at least substantially parallel to each other. Preferably, the infiltration-promoting material totally envelops each boron nitride-coated filament contained within the preform.

The present preform can be formed by a number of casting techniques by using a suspension of the infiltration-promoting material in a liquid vehicle, and preferably a casting technique is used.

Ser. No. 947,203 filed Dec. 29, 1986 for Fiber-And Filament-Containing Ceramic Preform And Composite, Hillig et al., assigned to the assignee herein and incorporated herein by reference, discloses a number of casting techniques which can be used herein.

The liquid vehicle used in forming the suspension is a liquid under ambient conditions in which the infiltration-promoting material can be effectively dispersed. Generally, the liquid vehicle is one which evaporates away at ambient pressure or under a partial vacuum at a temperature ranging from about ambient to about 100° C. Preferably, the liquid vehicle has a boiling point ranging from greater than about 30° C. to about 100° C. at ambient pressure. Representative of suitable liquid vehicles are water, methyl alcohol, ethyl alcohol, acetone, isopropyl alcohol, xylene and a mixture thereof. The liquid vehicle should have no significant deleterious effect on the present process.

Frequently, a deflocculant may be used, if desired, in forming the suspension. The deflocculant can be an organic or inorganic material and should be soluble in the liquid vehicle. The deflocculant need only be used in an amount which effectively aids in dispersing the infiltration-promoting material and such amount is determinable empirically. Generally, the deflocculant is used in an amount of less than about 5% by volume of the total volume of liquid vehicle. Representative of useful deflocculants are oleic acid and tetramethyl ammonium hydroxide.

Frequently, the suspension contains known bonding means, such as for example epoxy resin, to aid in forming the preform. Any deflocculants, binders or similar materials used in forming the suspension or preform should have no significant deleterious effect in the present process. Such materials are of the type which evaporate away on heating at temperatures below the present infiltration temperature, preferably below 500° C., leaving no deleterious residue.

As used herein, the term "suspension" includes slip and slurry.

The amount of infiltration-promoting material used in forming the suspension depends largely on the particular viscosity desired and generally it is greater than about 1% by volume, generally ranging from greater than about 1% by volume to about 3% by volume, of the total volume of suspension. The viscosity of the suspension can be adjusted by adjusting the concentration of the infiltration promoting material therein. The suspension is a pourable fluid under ambient conditions and generally has the consistency of pourable heavy cream.

The suspension can be formed by a number of conventional techniques such as by mixing all of its components generally at ambient temperature and pressure.

Preferably, a porous mold is provided which is capable of extracting the liquid vehicle from the suspension. The liquid vehicle can be extracted by being absorbed by the porous mold generally under ambient conditions, or it can be extracted by vacuum drawing the liquid vehicle through the porous mold. The mold should be of a form which allows the formation of the desired preform. The mold can be made of a variety of materials known in the art as useful for forming porous molds for slip casting and frequently it is plaster of paris.

In one embodiment, a suspension of the infiltration-promoting material is cast on or into the porous mold to form a layer of a slip-cast preform of desired thickness. As the liquid vehicle is extracted, the solids of the suspension are deposited on the mold surface. The boron-nitride coated filaments, either individually or a layer thereof, are then impressed into the layer of preform while it is still moist and then the suspension is deposited on the filaments to form another layer of the preform which at least covers the layer of filaments producing the present preform comprised of a layer of filaments wherein each filament is enveloped by the infiltration-promoting material.

Preferably, a layer of the boron nitride-coated filaments is pre-formed wherein the filaments are spaced from each other and are at least substantially parallel, or parallel, to each other. The minimum space between the filaments should be at least sufficient to enable the infiltration-promoting material to penetrate therebetween, and generally, it is at least about 50 microns.

The pre-formed layer of boron nitride-coated filaments can be produced by a number of conventional techniques. For example, the filaments can be uniaxially aligned and spaced by placing them in a suitable device provided with grooves and the desired spacing. The layer of filaments can be lifted off the device with adhesive tape placed across both ends of the filaments. The taped end portions of the filaments can eventually be ground away from the resulting preform.

In another embodiment, the suspension of infiltration-promoting material is poured into a mold and a pre-formed layer of boron nitride-coated filaments is immersed therein. As the liquid vehicle is extracted, the solids of the suspension are deposited on the filaments and on the mold surface.

Slip casting may be continued until the desired preform is produced. Also, the entire procedure may be repeated to produce the desired preform. There should be no contact between layers of filaments.

The slip-cast preform can be dried in a conventional manner, preferably under ambient conditions.

The slip-cast preform can be recovered from the mold in a conventional manner.

Preferably, the preform is of the size and shape desired of the composite. Generally, there is no significant difference in dimension between the preform and the resulting composite.

Generally, the present preform has an open porosity ranging from about 25% by volume to about 85% by volume of the preform, and the particular amount of such open porosity depends largely on the particular composite desired. Frequently, the preform has an open porosity ranging from about 35% by volume to about 80% by volume, or from about 40% by volume to about 60% by volume, of the preform. By open porosity of the preform, it is meant herein pores, voids or channels which are open to the surface of the perform thereby making the interior surfaces accessible to the ambient atmosphere or the infiltrant.

Generally, the preform has no closed porosity. By closed porosity it is meant herein closed pores or voids, i.e. pores not open to the surface of the preform and therefore not in contact with the ambient atmosphere.

Void or pore content, i.e. both open and closed porosity, can be determined by standard physical and metallographic techniques.

Preferably, the pores in the preform are small, preferably ranging from about 0.1 micron and about 50 microns, and preferably at least significantly or substantially uniformly distributed through the preform to enable the production of a composite wherein the matrix phase is at least significantly or substantially uniformly distributed through the composite.

The present boron-containing infiltrant is comprised of boron and silicon wherein boron ranges generally from about 0.1% by weight to about 10% by weight, frequently from about 1% by weight to about 10% by weight, and preferably from about 1% by weight to about 3% by weight, of silicon. Boron ranging from about 0.1% by weight to about 1.6% by weight of silicon is in solution in silicon, and at about 1.6% by weight it forms a saturated solution. In excess of about 1.6% by weight of silicon, boron forms a compound therewith which precipitates as a finely dispersed solid. Amounts of boron in excess of about 10% by weight of silicon provide no advantage. When the infiltrant is molten, the precipitate can be $SiB_3$, $SiB_6$ or a mixture thereof. The compounds of boron and silicon have no significant effect on the present process, i.e. they are substantially inert herein. Preferably, the infiltrant is a saturated solution.

The infiltrant can be formed in a known manner. For example, a solid particulate mixture of boron and silicon can be heated in an atmosphere non-oxidizing with respect to silicon to a temperature at which silicon is molten and boron will dissolve therein.

In carrying out the present process, the preform is contacted with infiltrant-associated infiltrating means whereby the infiltrant is infiltrated into the preform. The infiltrating means allow the molten infiltrant to be infiltrated into the preform. For example, a structure or assembly is formed comprised of the preform in contact with means that are in contact with the solid infiltrant and which permit infiltration of the infiltrant, when molten, into the preform. In one infiltration technique, the preform is placed on a woven cloth of elemental carbon, a piece of infiltrant is also placed on the cloth, and the resulting structure is heated to infiltration temperature. At infiltration temperature, the molten infiltrant migrates along the cloth and wicks into the preform. After infiltration, the wicking carbon cloth may be removed from the composite by diamond grinding.

In another technique, the silicon infiltration procedure can be carried out as set forth in U.S. Pat. No. 4,626,516 which discloses an assembly that includes a mold with infiltration holes and a reservoir holding elemental silicon. The preform is placed within the mold and carbon wicks are provided in the infiltrating holes. The wicks are in contact with the preform and also with the silicon and at infiltration temperature the molten silicon migrates along the wicks into the preform.

U.S. Pat. No. 4,737,328 to C. R. Morelock for INFILTRATION OF MATERIAL WITH SILICON, assigned to the assignee hereof and incorporated herein by reference, discloses another infiltration technique which comprises contacting the preform with a powder mixture composed of silicon and hexagonal boron nitride, heating the resulting structure to a temperature at which the silicon is fluid and infiltrating the fluid silicon into the preform. After infiltration, the resulting porous hexagonal boron nitride powder is brushed off the composite.

The present structure or assembly is heated to infiltration temperature in a gaseous atmosphere in which the molten silicon infiltrant is inert or substantially inert, i.e. the gaseous atmosphere should not significantly react with or significantly oxidize the silicon. Suitable gaseous atmospheres include argon, helium and hydrogen. The gaseous atmosphere can be at about atmospheric pressure but preferably it is below atmospheric pressure, i.e. preferably a partial vacuum is used.

In a preferred embodiment, the present structure or assembly is heated to infiltration temperature in a nonoxidizing partial vacuum wherein the residual gases have no significantly deleterious effect on said structure or assembly and the present infiltration is carried out in such nonoxidizing partial vacuum. Preferably, such nonoxidizing partial vacuum is provided before heating is initiated. The partial vacuum should be at least sufficient to avoid the entrapment of pockets of gas which would lead to excessive porosity, i.e. it should be sufficient to produce the present composite. Generally, such a partial vacuum ranges from about 0.01 torr to about 2 torr, and usually from about 0.01 torr to about 1 torr to insure a removal of entrapped gas in the preform being infiltrated.

Ordinarily and as a practical matter, the furnace used is a carbon furnace, i.e. a furnace fabricated from elemental carbon. Such a furnace acts as an oxygen getter for the atmosphere within the furnace reacting with oxygen to produce CO or $CO_2$ and thereby provides a nonoxidizing atmosphere, i.e. the residual gases have no significantly deleterious effect on the infiltrant. The present infiltration cannot be carried out in air because the molten silicon would oxidize to form a dense silica coating before any significant infusion by silicon occurred. In such instance where a carbon furnace is not used, it is preferable to have an oxygen getter present in the furnace chamber, such as elemental carbon, in order to insure the maintenance of a nonoxidizing atmosphere. Alternatively, other nonoxidizing atmospheres which have no significant deleterious effect on the structure within the furnace can be used at partial vacuums of about $10^{-2}$ torr to 2 torr.

The present infiltration is carried out at a temperature at which the infiltrant is moltent and which has no significant deleterious effect on the preform being infiltrated. The present infiltration temperature ranges from a temperature at which the infiltrant is molten to a temperature at which there is no significant vaporization of the infiltrant. Moltent silicon has a low viscosity. The melting point of the silicon can vary depending largely on the particular impurities which may be present. Generally, the present infiltration temperature ranges from greater than about 1400° C. to about 1550° C., and preferably from about 1420° C. to about 1500° C. The rate of penetration of the infiltrant into the preform depends on the wetting of the preform by the infiltrant melt and the fluidity of the melt. With increase in temperature, the ability of the molten infiltrant to wet the preform improves.

In the present process, sufficient infiltrant is infiltrated into the preform to produce the present composite. Infiltration is primarily or essentially by capillarity. Specifically, the molten infiltrant is mobile and highly reactive with elemental carbon, i.e. it has an affinity for elemental carbon, wetting it and reacting with it to form silicon carbide and/or boron-containing silicon carbide. The molten infiltrant also has an affinity for any metal with which it reacts to form the silicide thereof. In addition, sufficient infiltrant is infiltrated into the preform to fill pores or voids which may remain to produce the present composite.

The period of time required for infiltration is determinable empirically and depends largely on the size of the preform and extent of infiltration required. Generally, it is completed in less than about 20 minutes, and often in less than about 10 minutes.

The resulting infiltrated body is cooled in an atmosphere and at a rate which has no significant deleterious effect on it. Preferably it is furnace cooled in the nonoxidizing partial vacuum to about room temperature, and the resulting composite is recovered.

The present composite has a porosity of less than about 10% by volume, preferably less than about 5% by volume, and more preferably less than about 1% by volume, of the composite. Most preferably, the composite is void- or pore-free or has no significant or no detectable porosity. Preferably, any voids or pores in the composites are small, preferably less than about 50 microns or less than about 10 microns, and they are significantly or substantially uniformly distributed in the composite. Specifically, any voids or pores are sufficiently uniformly distributed throughout the composite so that they have no significant deleterious effect on its mechanical properties.

The present composite is comprised of boron nitride-coated filaments and a matrix phase. The filaments are parallel, or at least substantially parallel, to each other and there is no contact between the boron nitride-coated filaments. The matrix phase is distributed through the boron nitride-coated filaments and generally it is space filling or substantially completely space filling. Each boron nitride-coated filament is enveloped by the matrix phase. Generally, at least the entire wall of the boron nitride-coated filament is enveloped or totally enveloped, by the matrix phase, and usually each filament is totally enveloped by the matrix phase. The matrix phase is continuous and interconnecting. The filament component of the boron nitride-coated filaments comprises at least about 10% by volume, or at least about 30% by volume, or at least about 50% by volume, of the composite. The matrix phase contains a silicon carbide phase formed in situ in an amount of at least about 5% by volume, or at least about 10% by volume, or at least about 30% by volume, or at least about 45% by volume, of the composite, and a phase in an amount of at least about 1% by volume of the composite of a solution of boron and silicon wherein boron is at least about 0.1% by weight of silicon.

The filaments in the composite are coated with boron nitride which is at least detectable by scanning electron microscopy and generally ranges in thickness from such detectable amount to about 5 microns, frequently from about 0.5 microns to about 1.5 microns. The particular amount of boron nitride in the composite provided by the boron nitride coating depends largely on the amount of coated filaments present, the thickness of the boron nitride coating and the diameter of the filament. Therefore, the volume fraction of boron nitride provided by the coating is the balance of the volume fraction of all other components of the composite. Frequently, however, the boron nitride coating on the filaments in the composite generally ranges from less than about 1% by volume to about 20% by volume, or from about 1% by volume to about 10% by volume, or from about 1% by volume to about 5% by volume, of the total volume of boron nitride-coated filaments.

Generally, the filament component of the boron nitride-coated filaments ranges from about 10% by volume to less than about 75% by volume, or from about 20% by volume to about 70% by volume, or from about 30% by volume to about 60% by volume, of the composite. Generally, the boron nitride-coated filaments are distributed through the composite, and most often, they are distributed significantly uniformly through the composite. However, in some cases it is desirable to have higher packing fractions of the boron nitride-coated filaments in regions of the composite where higher local strength or stiffness may be desired. For example, in a structure having a long thin part, such as a valve stem, it is advantageous to strengthen the stem by increasing the volume fraction of the boron nitride-coated filaments in the stem region of the structure.

Generally, the phase formed in situ of silicon carbide and/or boron-containing silicon carbide ranges from about 5% by volume to less than about 89% by volume, or from about 10% by volume to less than about 79% by volume, or from about 30% by volume to about 59% by volume, or from about 45% by volume to about 55% by volume, of the composite. Generally, the in situ-formed silicon carbide phase is distributed through the composite, and preferably, it is distributed significantly uniformly. Frequently, the matrix is comprised of silicon carbide phase formed in situ and at least about 1% by volume of a phase of a solution of boron and silicon.

Generally, the phase comprised of a solution of elemental boron and elemental silicon ranges from about 1 by volume to about 30% by volume, or to about 10% by volume, or to about 5% by volume, or to about 2% by volume of the composite. In this phase, boron ranges from about 0.1% by weight to about 1.6% by weight of silicon. More sensitive techniques such as microprobe analysis or Auger electron spectroscopy may be required to detect or determine the amount of boron dissolved in silicon. Generally, this phase of a solution of boron and silicon is distributed through the composite, and preferably, it is distributed significantly uniformly.

The present composite may contain a phase of a compound of boron and silicon usually selected from the group consisting of $SiB_3$, $SiB_6$ and a mixture thereof which generally is distributed through the composite. The compound of boron and silicon usually ranges from an amount detectable by microprobe analysis up to about 30% by volume, or up to about 5% by volume, or up to about 1% by volume, of the composite.

The present composite may contain a phase of a ceramic material disclosed as an infiltration-promoting material therein, as well as a boron-containing metal silicide phase formed in situ, generally ranging up to about 50% by volume, frequently from about 1% by volume to about 30% by volume, of the composite. Generally, the ceramic material is distributed through the composite, and preferably, it is distributed at least significantly uniformly.

The present composite may contain a phase of a metal which forms a silicide but which had not reacted with the infiltrant. In such instance, it would be encapsulated by a metal silicide phase and/or boron-containing metal silicide phase. Generally, such metal generally ranges from about 0.5% by volume to about 5% by volume of the composite. Generally, such metal is distributed through the composite, and preferably, it is distributed at least significantly uniformly.

The matrix of the present composite may contain a phase of elemental carbon which has a significant amount of graphitic structure, i.e. a less reactive type of carbon, which had not completely reacted with the infiltrating silicon. In such instance, this type of carbon would be totally encapsulated by a phase of silicon carbide and/or boron-containing silicon carbide formed in situ. Such graphitic structure-containing elemental carbon generally can range from about 0.5% by volume to about 10% by volume, frequently from about 1% by volume to about 5% by volume, of the composite. Generally, such graphitic structure-containing elemental carbon is distributed through the composite, and preferably, it is distributed at least significantly uniformly.

The present composite is at least bonded by silicon carbide and/or boron-containing silicon carbide phase formed in situ. It may also be bonded by a metal silicide phase and/or boron-containing metal silicide phase which formed in situ. It may also be bonded by a phase formed by the present infiltrant comprised of a solution of boron and silicon or a bond formed in situ between such infiltrant and a ceramic material.

The bonding of the boron nitride-coated filaments in the present composite enables such filaments to impart significant toughness to the composite. Specifically, the bonding of the boron nitride-coated filaments is of a type which prevents brittle fracture of the composite at room temperature, i.e. 25° C. By brittle fracture of a composite it is meant herein that the entire composite cracks apart at the plane of fracture. In contrast to a brittle fracture, the present composite exhibits filament pull-out on fracture at room temperature. Specifically, as the present composite cracks open, generally at least about 10% by volume, frequently at least about 50% by volume and preferably all of the boron nitride-coated filaments pull out and do not break at the plane of fracture at room temperature.

One particular advantage of this invention is that the present composite can be produced directly in a wide range of sizes and shapes which heretofore may not have been able to be manufactured or which may have required expensive and tedious machining. For example, the present composite can be as long as desired. It can be of simple, complex and/or hollow geometry. For example, it can be produced in the form of a tube or a hollow cylinder, a ring, a sphere or a bar. Also, since the present composite can be produced in a predetermined configuration of predetermined dimensions, it requires little or no machining.

The present composite has a wide range of applications depending largely on its particular composition. It can be used, for example, as a wear resistant part, bearing or tool insert, acoustical part and high-temperature structural components.

The invention is further illustrated by the following example where, unless otherwise stated, the procedure was as follows:

Commercially available continuous filaments of silicon carbide produced by a chemical vapor deposition process and sold under the trademark AVCO SCS-6 were used. These filaments had a 35 micron core on which silicon carbide was deposited to an overall diameter of about 145 microns. The outside surface of the filaments consisted of two layers of pyrolytic carbon and carbon-silicon, with overall thickness of about 3 microns. In air at room temperature these filaments have a tensile strength of about 500 thousand psi and a tensile modulus of about 60 million psi.

The binder was comprised of "Epon 828" which contained a curing agent. "Epon 828" is a resin formed from the reaction of epichlorohydrin and Bisphenol A, which is a liquid at room temperature. The curing agent was diethylenetriamine, a liquid commonly called DTA which cures Epon 828 thereby solidifying it. It was used in an amount of about 10% by weight of Epon 828. This binder decomposes below about 500° C.

The infiltrant was produced by forming a mixture of boron and silicon powders wherein boron was present in an amount of about 3% by weight of silicon. The mixture was heated in a vacuum, non-oxidizing with respect to silicon, to about 1450° C. and boron dissolved in the molten silicon forming a saturated solution as well as a finely divided precipitate of a compound of boron and silicon. The melt was then cooled to room temperature in the same vacuum. The resulting solid was then broken into small chunks.

The carbon resistance furnace used to form the composite was contained in a vacuum belljar system.

EXAMPLE 1

This example illustrates coating of the filaments with boron nitride.

Continuous silicon carbide filaments having a length of about 1.75 inches were placed on a molybdenum screen and coated with boron nitride by the following low pressure chemical vapor deposition process utilizing the reaction $B_3N_3H_3Cl_3 \rightarrow 3BN + 3HCl$.

The molybdenum screen containing the filaments was positioned at about the midpoint of the hot zone of a pyrex/quartz/pyrex furnace tube.

Commercial trichloroborazine ($B_3N_3H_3Cl_3$) was used. A 1.00 gram sample of this solid was transferred in an argon-filled glove box to a pyrex end-section which contained a thermocouple vacuum gauge, a cold trap and a vacuum stopcock.

The closed pyrex end-section was then taken out of the glove box and attached to an end of the furnace tube and to a vacuum system. The end-section containing the trichloroborazine was then cooled using liquid nitrogen and the furnace tube was opened to the vacuum system via the stopcock of the pyrex end-section. After the system reached a pressure lower than 0.020 torr, the furnace was heated to about 1050° C. When the pressure had again dropped below 0.020 torr and the furnace temperature had stabilized, the end-section containing the trichloroborazene was warmed by an oil bath maintained at 60° C., whereupon the solid began to vaporize, depositing BN and liberating gaseous HCl in the hot zone of the furnace tube and producing an increase in pressure.

The pressure was observed to reach as high as about 200 torr before stabilizing at about 50 torr. After two hours, the pressure was found to have decreased to about 0.020 torr, whereupon the furnace was shut down and the system allowed to cool to room temperature before opening the tube and removing the sample.

Identification of the chemically vapor deposited layer as BN was accomplished by means of electrical resistance measurement and a quantitative ESCA analysis of a film deposited in substantially the same manner on a SiC disk surface. This film was amorphous to x-rays in the as-deposited condition and appeared fully dense and smooth at high magnification in the SEM.

Scanning electron microscopy observation of the ends of coated and broken filaments revealed that the coating was continuous and smooth and about 1.5 microns thick on the filament and left no significant portion of the filament exposed.

EXAMPLE 2

The boron nitride-coated filaments produced in Example 1 were uniaxially aligned by placing them in a device for aligning filaments and maintaining the required spacing between them. This device was made from a copper foil laminated on a printed circuit board which was etched by the photolithographic technique in such a way as to produce parallel grooves about 0.006 inch diameter, 0.004 inch deep and 0.008 inch inch apart (center-to-center). The coated silicon carbide filaments were placed on this device and a simple scoop of the filaments using a straight edge led to filling of each of the grooves with a filament. This resulted in a single layer of uniformly spaced filaments which were lifted off the board by putting adhesive tapes across each end portion of the filament layer. The adhesive tapes were sufficient to maintain the alignment and spacing between the filaments. Several such pre-formed layers of filaments were produced in which the filaments were parallel and spaced about 100 microns from each other.

A suspension comprised of 1 part (by weight) crushed carbon felt, 1 part of binder, and 1 part xylene was poured into a casting mold. Four layers of filaments were dropped into the mold, one at a time, and pushed toward the bottom of the mold with a straight edge. The house vacuum was then applied to the mold to produce a vacuum-cast preform containing coated filaments submerged in a slurry of crushed carbon fibers and binder. This preform was cured overnight in the mold at room temperature and subsequently for an hour at about 100° C. At this point the preform had sufficient strength and could be shaped by machining. The crushed carbon in the preform provided the channels and optimum pore size for rapid infiltration of molten silicon by way of Si-C reaction and wicking. The preform was in the shape of a bar about 2.5 inches ×0.5 inches ×0.070 inches and had an open porosity of at least about 50% by volume.

The preform and solid pieces of infiltrant were placed on a woven carbon fabric which was contained in a BN-sprayed graphite tray. This tray was then placed in a carbon resistance heated belljar furnace and slowly heated at a rate of about 10° C. per minute to about 400° C. in a vacuum of about 0.05 torr. The slow heating at this stage assured slow decomposition of the epoxy binder which otherwise may lead to disintegration of the preform. Subsequent to this, the preform was rapidly heated to 1420° C. at which point the infiltrant was fluid and reacted with the carbon cloth and got wicked into the preform. A considerable amount of heat which was detected by a thermocouple placed on top of the preform was generated due to the exothermic reaction of the infiltrant with carbon fibers in the matrix. The preform was held for 5 minutes under these conditions and then slowly cooled below the melting point of the infiltrant after which the furnace power was turned off and the infiltrated sample was cooled to room temperature in the vacuum of the belljar.

The resulting composite had a porosity of less than about 1% by volume. It was estimated to be comprised of, based on the volume of the composite, of about 70% by volume of silicon carbide phase and/or boron-containing silicon carbide phase formed in situ, about 10% by volume of a phase comprised of a solution of elemental boron and elemental silicon wherein boron was present in an amount of about 1.6% by weight of silicon, a minor amount of a compound of boron and silicon, and about 20% by volume of boron nitride coated filaments of silicon carbide of which the silicon carbide filament component comprised about 18% by volume.

The composite was broken in a three-point-bend flexure mode to determine the load-deflection behavior. The three-point-bend test results are illustrated in FIG. 1. From the graph in FIG. 1, it can be seen that this composite showed toughened-ceramic-like behavior. The load-deflection curve for this sample shows the onset of matrix cracking followed by a significant rise in the load carrying capability of the composite. An ultimate load was reached beyond which the composite showed graceful failure i.e., gradual decrease in the load on extensive failure of the composite.

A number of additional composites were prepared in substantially the same manner. The composites made in this way showed an ultimate strength between 45,000 psi and 72,000 psi.

Examination of the fractured cross-section in a Scanning Electron Microscope revealed fiber pullout which is consistent with the observed load-deflection behavior. Also, the boron nitride coating appeared intact around the filaments. All of the components of the composite were distributed through the composite. The filaments were substantially parallel to each other and there was no contact between filaments.

This composite would be useful as a high temperature structural material in an aircraft engine.

EXAMPLE 3

This example was carried out in substantially the same manner as that disclosed in Example 2 except that the silicon carbide filaments were not coated with boron nitride.

The load-deflection behavior of this composite is shown in FIG. 1. From FIG. 1 it can be seen that this composite displayed brittle-ceramic-like behavior. The composite also showed a low strength (less than 30,000 psi).

Examination of the fractured cross-section in a Scanning Electron Microscope revealed no fiber pullout which is consistent with the observed load-deflection behavior.

EXAMPLE 4

This example was carried out in substantially the same manner as disclosed in Example 3 except that no filaments were used.

The load-deflection behavior of this composite is shown in FIG. 1 and is the same as that produced by the composite of Example 3.

What is claimed is:

1. A process for producing a composite with a porosity of less than about 10% by volume comprised of boron nitride-coated filaments and a matrix phase, said filament component of said coated filaments comprising at least about 10% by volume of the composite, said matrix phase containing silicon carbide and/or boron-containing silicon carbide formed in situ in an amount of at least about 5% by volume of the composite and a solution of elemental boron and elemental silicon in an amount of at least about 1% by volume of the composite, which comprises the following steps:

(a) providing a carbon-containing filament having a diameter of at least about 50 microns;

(b) depositing a coating of boron nitride on said filament leaving no significant portion thereof exposed;

(c) providing infiltration-promoting material in the form of particulates and/or fibers, said infiltration-promoting material containing elemental carbon;

(d) contacting a plurality of said boron nitride-coated filaments with said infiltration-promoting material to produce a preform wherein said infiltration-promoting material envelops each coated filament preventing contact therebetween and wherein said coated filaments are at least substantially parallel to each other, said preform having an open porosity ranging from about 25% by volume to about 85% by volume of the preform;

(e) providing an infiltrant comprised of boron and silicon containing elemental boron in solution in silicon in an amount of at least about 0.1% by weight of elemental silicon;

(f) contacting said preform with infiltrant-associated infiltrating means whereby said infiltrant is infiltrated into said preform;

(g) heating the resulting structure to a temperature at which said infiltrant is molten and infiltrating said molten infiltrant into said preform to produce an infiltrated product having the composition of said composite, said preform containing sufficient elemental carbon to react with said infiltrant to form said composite; and (h) cooling said product to produce said composite, said boron nitride-coated filaments being enveloped by said infiltration-promoting material to enable said infiltration by molten infiltrant.

2. The process according to claim 1 wherein said preform has an open porosity ranging from about 35% by volume to about 80% by volume.

3. The process according to claim 1 wherein said infiltration-promoting material is comprised of elemental carbon.

4. The process according to claim 1 wherein said filament is comprised of elemental carbon.

5. The process according to claim 1 wherein said filament is comprised of silicon carbide.

6. The process according to claim 1 wherein said matrix phase is comprised of said silicon carbide formed in situ and said elemental silicon.

7. The process according to claim 1 wherein said infiltration-promoting material is formed into a suspension in a liquid vehicle, wherein a layer of said boron nitride-coated filaments is pre-formed in which said filaments are spaced and substantially parallel, and wherein said layer of filaments is immersed in said suspension and said liquid vehicle is extracted therefrom to produce said preform.

8. The process according to claim 1 wherein said infiltration-promoting material is formed into a suspension, a part of said suspension is slip cast until a pliable mass of said infiltration-promoting material is formed, said boron nitride-coated filaments are pressed into said mass and additional suspension is slip cast on at least the exposed portions of said filaments to produce said preform.

9. A composite comprised of boron nitride-coated carbon-containing filaments and a matrix phase, said matrix phase containing silicon carbide phase and/or boron-containing silicon carbide phase and a solution phase comprised of a solution of boron and silicon wherein boron is present in an amount of at least about 0.1% by weight of silicon, said carbide phase being present in an amount of at least about 5% by volume of said composite, said solution phase being present in an amount of at least about 1% by volume of said composite, said filament component of said boron nitride-coated filaments being present in an amount of at least about 10% by volume of said composite, said boron nitride coating being at least detectable by scanning electron microscopy, said boron nitride-coated filaments being at least substantially parallel to each other and spaced from each other, said filament component of said boron nitride-coated filaments having a diameter of at least about 50 microns, said boron nitride-coated filaments being spaced from each other by at least about 50 microns, said matrix phase being continuous, interconnecting and enveloping each of said boron nitride-coated filaments, said composite having a porosity of less than about 10% by volume.

10. The composite according to claim 9 wherein a compound of boron and silicon is present ranging up to about 10% by volume of said composite.

11. The composite according to claim 9 wherein said filament component is comprised of elemental carbon.

12. The composite according to claim 9 wherein said filament component is comprised of silicon carbide.

13. The composite according to claim 9 wherein said matrix phase is comprised of said silicon carbide phase and said solution phase.

14. The composite according to claim 9 wherein said filament component is present in an amount of at least about 50% by volume of said composite.

15. A composite comprised of at least a layer of boron nitride-coated filaments and a matrix phase, said filament component of said boron nitride-coated filaments ranging from about 10% by volume to about 70% by volume of the composite and being selected from the group consisting of elemental carbon, a SiC-containing material containing by weight of the SiC-containing material at least about 50% by weight of silicon and at least about 25% by weight of carbon, and a combination thereof, said boron nitride coating being at least detectable by scanning electron microscopy, said boron nitride-coated filaments being at least substantially parallel to each other and spaced from each other, said filament component of said boron nitride-coated filaments having a diameter of at least about 50 microns, said boron nitride-coated filaments being spaced from each other by at least about 50 microns, said matrix phase being continuous, interconnecting and enveloping each of said boron nitride-coated filaments, said coated filaments being distributed through said composite, said matrix phase being comprised of a phase of silicon carbide and/or boron-containing silicon carbide and a solution phase, said solution phase being comprised of a solution of boron and silicon wherein boron is present in an amount of at least about 1% by weight of silicon, said carbide phase being present in an amount of at least about 10% by volume of said composite, said solution phase being present in an amount of at least about 1% by volume of said composite, said matrix phase enveloping each of said boron nitride-coated filaments, said composite having a porosity of less than about 10% by volume.

16. The composite according to claim 15 wherein a compound of boron and silicon is present ranging up to about 10% by volume of said composite.

17. The composite according to claim 15 wherein said silicon carbide phase ranges from about 10% by volume to less than about 79% by volume of said composite.

18. The composite according to claim 15 wherein said filament component is comprised of elemental carbon.

19. The composite according to claim 15 wherein said filament component is comprised of silicon carbide.

20. The process according to claim 1, wherein said infiltration-promoting material in step (c) contains molybdenum in an amount of at least about 1% by volume of said infiltration-promoting material.

21. The composite according to claim 9, wherein said matrix phase contains molybdenum silicide ranging up to about 50% by volume of the composite.

22. The composite according to claim 15, wherein said matrix phase contains molybdenum silicide ranging up to about 50% by volume of the composite.

23. A composite comprised of boron nitride-coated carbon-containing filaments and a matrix phase, said matrix phase containing silicon carbide phase and/or boron-containing silicon carbide phase and a solution phase comprised of a solution of boron and silicon wherein boron is present in an amount of at least about 0.1% by weight of silicon, said carbide phase being present in an amount of at least about 5% by volume of said composite, said solution phase being present in an amount of at least about 1% by volume of said composite, said filament component of said boron nitride-coated filaments being present in an amount of at least about 10% by volume of said composite, said boron nitride coating being at least detectable by scanning electron microscopy, said boron nitride-coated filaments being at least substantially parallel to each other and spaced from each other, said filament component of said boron nitride-coated filaments having a diameter of at least about 50 microns, said matrix phase being continuous, interconnecting and enveloping each of said boron nitride-coated filaments, said composite having a porosity of less than about 10% by volume.

24. The composite according to claim 23, wherein said filament component is comprised of elemental carbon.

25. The composite according to claim 23, wherein said filament component is comprised of silicon carbide.

26. The composite according to claim 23, wherein said matrix phase contains molybdenum silicide ranging up to about 50% by volume of the composite.

27. A process for producing a composite with a porosity of less than about 10% by volume comprised of boron nitride-coated filaments and a matrix phase, said filament component of said coated filaments comprising at least about 10% by volume of the composite, said matrix phase containing silicon carbide and/or boron-containing silicon carbide formed in situ in an amount of at least about 5% by volume of the composite and a solution of elemental boron and elemental silicon in an amount of at least about 1% by volume of the composite, which comprises the following steps:
(a) providing a carbon-containing filament having a diameter of at least about 50 microns;
(b) depositing a coating of boron nitride on said filament leaving no significant portion thereof exposed;
(c) providing infiltration-promoting material in the form of particulates and/or fibers, said infiltration-promoting material containing elemental carbon;
(d) contacting a plurality of said boron nitride-coated filaments with said infiltration-promoting material to produce a preform wherein said infiltration-promoting material envelops each coated filament preventing contact therebetween and wherein said coated filaments are at least substantially parallel to each other, said preform having an open porosity ranging from about 25% by volume to about 85% by volume of the preform;
(e) providing an infiltrant composition comprised of boron and silicon wherein boron ranges from about 0.1% by weight to about 10% by weight of elemental silicon;
(f) contacting said preform and said infiltrant composition with infiltrating means whereby molten infiltrant is infiltrated into said preform;
(g) heating the resulting structure to a temperature at which said infiltrant composition is molten resulting in a molten infiltrant containing elemental boron in solution in silicon in an amount ranging from about 0.1% by weight of silicon to an amount which forms a saturated solution with silicon and infiltrating said molten infiltrant into said preform to produce an infiltrated product having the composition of said composite, said preform containing sufficient elemental carbon to react with said infiltrant to form said composite; and
(h) cooling said product to produce said composite, said boron nitride-coated filaments being enveloped by said infiltration-promoting material to enable infiltration by molten infiltrant.

28. The process according to claim 27, wherein said filament is comprised of elemental carbon.

29. The process according to claim 27, wherein said filament is comprised of silicon carbide.

30. The process according to claim 27, wherein said infiltration-promoting material in step (c) contains molybdenum in an amount of at least about 1% by volume of said infiltration-promoting material.

31. A process for producing a composite with a porosity of less than about 10% by volume comprised of boron nitride-coated filaments and a matrix phase, said filament component of said coated filaments comprising at least about 10% by volume of the composite, said matrix phase containing silicon carbide and/or boron-containing silicon carbide formed in situ in an amount of at least about 5% by volume of the composite and a solution of elemental boron and elemental silicon in an amount of at least about 1% by volume of the composite, which comprises the following steps:
(a) providing a carbon-containing filament having a diameter of at least about 50 microns;
(b) depositing a coating of boron nitride on said filament leaving no significant portion thereof exposed;
(c) forming a preform comprised of infiltration-promoting material and a plurality of said boron nitride-coated filaments wherein said infiltration-promoting material envelops each coated filament preventing contact therebetween and wherein said coated filaments are at least substantially parallel to each other, said preform having an open porosity ranging from about 25% by volume to about 85% by volume of the preform, said infiltration-promoting material being in the form of particulates and/or fibers, said infiltration-promoting material containing elemental carbon;
(d) providing an infiltrant comprised of boron and silicon containing elemental boron in solution in silicon in an amount of at least about 0.1% by weight of elemental silicon;
(e) contacting said preform with infiltrant-associated infiltrating means whereby said infiltrant is infiltrated into said preform;
(f) heating the resulting structure to a temperature at which said infiltrant is molten and infiltrating said molten infiltrant into said preform to produce an infiltrated product having the composition of said composite, said preform containing sufficient elemental carbon to react with said infiltrant to form said composite; and
(g) cooling said product to produce said composite, said boron nitride-coated filaments being enveloped by said infiltration-promoting material to enable said infiltration by molten infiltrant.

32. The process according to claim 31, wherein said preform has an open porosity ranging from about 35% by volume to about 80% by volume.

33. The process according to claim 31, wherein said infiltration-promoting material in step (c) is comprised of elemental carbon.

34. The process according to claim 31, wherein said filament is comprised of elemental carbon.

35. The process according to claim 31, wherein said filament is comprised of silicon carbide.

36. The process according to claim 31, wherein said infiltration-promoting material in step (c) contains molybdenum in an amount of at least about 1% by volume of said infiltration-promoting material.

37. A process for producing a composite with a porosity of less than about 10% by volume comprised of boron nitride-coated filaments and a matrix phase, said filament component of said coated filaments comprising at least about 10% by volume of the composite, said matrix phase containing silicon carbide and/or boron-containing silicon carbide formed in situ in an amount of at least about 5% by volume of the composite and a solution of elemental boron and elemental silicon in an amount of at least about 1% by volume of the composite, which comprises the following steps:

(a) providing a carbon-containing filament having a diameter of at least about 50 microns;

(b) depositing a coating of boron nitride on said filament leaving no significant portion thereof exposed;

(c) forming a preform comprised of infiltration-promoting material and a plurality of said boron nitride-coated filaments wherein said infiltration-promoting material envelops each coated filament preventing contact therebetween and wherein said coated filaments are at least substantially parallel to each other, said preform having an open porosity ranging from about 25% by volume to about 85% by volume of the preform, said infiltration-promoting material being in the form of particulates and/or fibers, said infiltration-promoting material containing elemental carbon;

(d) providing an infiltrant composition comprised of boron and silicon wherein boron ranges from about 0.1% by weight to about 10% by weight of elemental silicon;

(e) contacting said preform and said infiltrant composition with infiltrating means whereby molten infiltrant is infiltrated into said preform;

(f) heating the resulting structure to a temperature at which said infiltrant composition is molten resulting in a molten infiltrant containing elemental boron in solution in silicon in an amount ranging from about 0.1% by weight of silicon to an amount which forms a saturated solution with silicon and infiltrating said molten infiltrant into said preform to produce an infiltrated produce having the composition of said composite, said preform containing sufficient elemental carbon to react with said infiltrant to form said composite; and (g) cooling said product to produce said composite, said boron nitride-coated filaments being enveloped by said infiltration-promoting material to enable said infiltration by molten infiltrant.

38. The process according to claim 37, wherein said filament is comprised of elemental carbon.

39. The process according to claim 37, wherein said filament is comprised of silicon carbide.

40. The process according to claim 37, wherein said infiltration-promoting material in step (c) contains molybdenum in an amount of at least about 1% by volume of said infiltration-promoting material.

41. The process according to claim 1, wherein said infiltration-promoting material in step (c) contains molybdenum carbide in an amount of at least about 1% by volume of said infiltration-promoting material.

42. The process according to claim 27, wherein said infiltration-promoting material in step (c) contains molybdenum carbide in an amount of at least about 1% by volume of said infiltration-promoting material.

43. The composite according to claim 9, wherein said matrix phase contains molybdenum carbide ranging up to about 50% by volume of the composite.

44. The composite according to claim 23, wherein said matrix phase contains molybdenum carbide ranging up to about 50% by volume of the composite.

* * * * *